April 19, 1966   R. V. LEVETAN   3,247,414
PLASTIC COMPOSITIONS FOR ELECTROLUMINESCENT CELLS
Filed Dec. 27, 1962
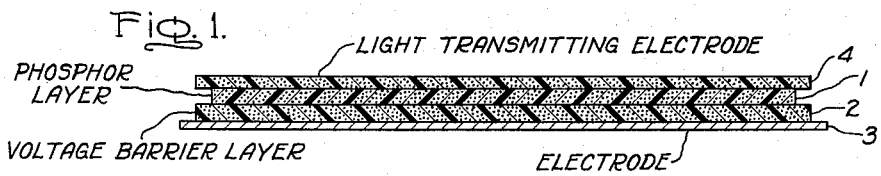
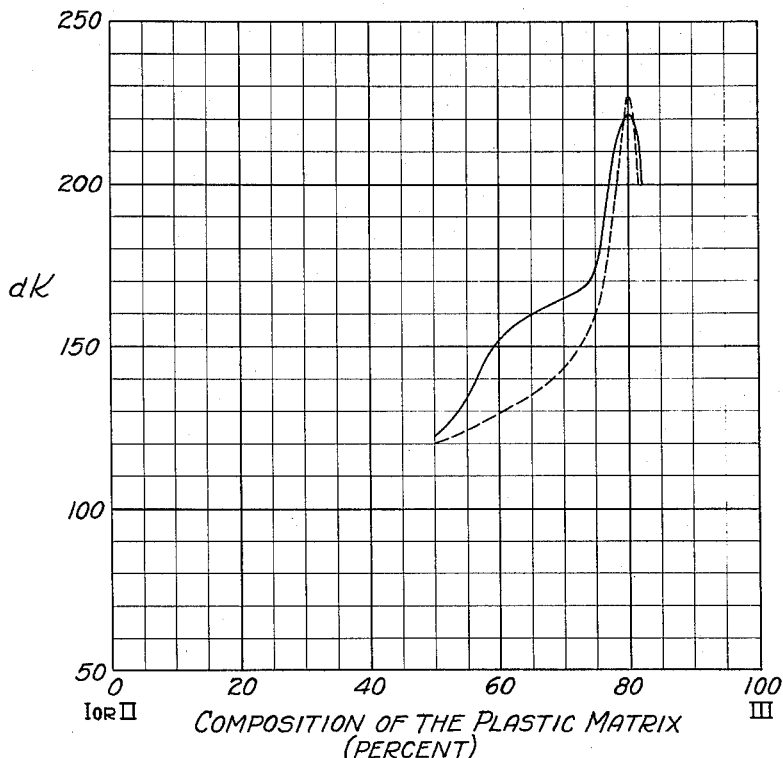
Inventor:
Robert V. Levetan
by Otto Tichy
His Attorney United States Patent Office 3,247,414
Patented Apr. 19, 1966

3,247,414
PLASTIC COMPOSITIONS FOR ELECTRO-
LUMINESCENT CELLS
Robert V. Levetan, Solon, Ohio, assignor to General
Electric Company, a corporation of New York
Filed Dec. 27, 1962, Ser. No. 247,648
15 Claims. (Cl. 313—108)

This invention relates generally to a novel plastic composition having a high dielectric constant and being especially useful in electrical capacitors including electroluminescent cells.

An electroluminescent device normally comprises a layer of phosphor sandwiched between electrodes at least one of which is light-transmitting. Layers of plastic material having a high dielectric constant may be employed to serve as matrices for the phosphor, for a voltage barrier material and, in some cases, for the electrically conductive constituent of the light-transmitting electrode. When an alternating voltage is applied across the electrodes, the phosphor produces light which is transmitted through the conductive electrode. It is well known in the art that, within certain limits, the higher the dielectric constant of the matrix in which the phosphors are embedded, the greater the output light intensity will be. The use of a high dielectric constant matrix for the phosphors concentrates the applied electric field in the phosphor crystals.

In general plastic technology, a small amount of relatively low boiling point monomer plasticizer is used with a larger amount of higher boiling polymer resin to produce a plastic having the desired characteristics. As such, a well formulated plastic is a macromolecular solution from which the plasticizer will not exude or sweat out on aging, leaving the resin unplasticized. However, the plasticizer will generally form a significant part of the organic solution and the dielectric constant of the plasticizer may have a substantial effect on the dielectric constant of the material entirely apart from its plasticizing function.

It is an object of the invention to provide a novel plastic composition having improved electrical properties including high dielectric constant. It is another object to provide electroluminescent cells of increased brightness by virtue of the incorporation of such plastic compositions.

Briefly, in accordance with one aspect of the invention, I have discovered that a plastic composition having improved electrical properties results when a cyanoethylated polysaccharide resin, such as cyanoethyl cellulose (I) or cyanoethyl starch (II), is mixed with cyanoethyl sucrose (III) as a plasticizer, in relatively high proportions by volume, of the cyanoethyl sucrose. Such mixtures have an unusually high dielectric constant different from that expected from the proportionate values of the constituents. Furthermore, incorporation of the new plastic compositions as the dielectric matrix in the phosphor layer and the insulating barrier layer provides layers of exceptionally high dielectric constant, and electroluminescent lamps embodying such layers are significantly brighter than prior art lamps operated at the same voltage and frequency. This plastic is also useful as the matrix material in an electrically conductive, light transmitting electrode for use in an electroluminescent lamp. Particularly good results have been obtained when using volume proportions of cyanoethyl sucrose to cyanoethylated polysaccharide greater than 1:1 and up to 5:1, preferably between 3:1 and 5:1 with an optimum at about 4:1.

Further features and advantages of the invention will appear from the following detailed description taken in conjunction with the drawing wherein:

FIG. 1 is a schematic view, in cross section, of an electroluminescent device embodying the invention; and FIG. 2 is a graph showing the dielectric constant values of a voltage barrier layer consisting of a high dielectric constant powder dispersed in a plastic matrix of composition in accordance with the invention and in varying proportions.

As illustrated in FIG. 1, the phosphor layer 1 of the electroluminescent device comprises a plastic layer consisting of cyanoethyl sucrose and a cyanoethylated polysaccharide having a phosphor suspended or embedded therein. A voltage barrier layer 2 of high dielectric constant and high dielectric strength material, such as barium titanate or titanium dioxide is embedded in a similar plastic matrix and is in contact with one side of the phosphor layer. An electrode 3 is positioned on the outside of the voltage barrier layer. To complete the device, a light-transmitting electrode 4 is positioned outside the phosphor-containing layer.

The electrode 3 may be comprised of any one of several metals including, for example, copper, aluminum and silver. The light-transmitting electrode 4 may likewise be composed of one of several materials including, for example, glass papers coated with a semiconductor such as tin oxide, cadmium oxide, or indium oxide as described in Patent 2,774,004—Jaffe, "Flexible Electroluminescent Lamp Panel"; it may also include an electrically conductive lacquer containing similar semiconductors embedded in an organic, plastic matrix of a composition in accordance with the invention.

The phosphor embedded in the cyanoethyl sucrose-cyanoethylated polysaccharide plastic layer 1 may comprise any one or more of the electroluminescent phosphors well-known in the art such as zinc sulphide-zinc oxide activated with copper and chlorine. The voltage barrier layer increases the breakdown strength of the electroluminescent device, allowing higher stresses to be placed on the phosphor. The higher the dielectric constant of the barrier layer, the lower a proportion of the total available voltage drop occurs across the barrier layer. The power source can be connected by any suitable means to the two electrodes, one on either side of the device.

Generally, an electroluminescent device can be characterized as a luminous capacitor. These devices can be constructed and used for various purposes including, among others, the production of visible light for low level illumination as shown in Patent 2,945,976—Fridrich et al., "Electroluminescent Lamps and Manufacture Thereof." Also, they are used for image presentation purposes and, in conjunction with photoconductors and other light-sensitive devices, as electric circuit elements in the construction of oscillators, flip-flop circuits, optical pulse stretchers, optical differentiation devices and other electrical devices.

In accordance with the invention, it has been discovered that cyanoethyl sucrose, which has a dielectric constant of about 40, can be used in unusually large quantities as a plasticizer for cyanoethylated polysaccharides, such as cyanoethyl cellulose which has a dielectric constant of about 14 or cyanoethyl starch which has a dielectric constant of about 16, to produce a plastic matrix material with an entirely unexpected dielectric behavior, and which can be made to have a dielectric constant considerably higher than any other available plastic material.

A plastic made with four parts cyanoethyl sucrose and one part cyanoethyl cellulose and containing 50% by volume of barium titanate as a voltage barrier material has a dielectric constant of about 227. It will be noted from FIG. 2 that when cyanoethyl sucrose is used as a plasticizer with either cyanoethyl cellulose or cyanoethyl starch a 1:1 solution mixed with 50% by volume of barium titanate has a dielectric constant of about 122 and a 5:1 solution has a dielectric constant of about 200. Thus, it is seen that the 4:1 solution, which is the optimum composition, produces an unusually high dielectric constant plastic matrix. All dielectric constants referred to herein are measured with 60 cycle power unless otherwise noted. In the graph of FIG. 2, percentage composition corresponds to proportional ratios as follows:

| | Percent |
|---|---|
| 1:1 | 50 |
| 2:1 | 67 |
| 3:1 | 75 |
| 4:1 | 80 |
| 5:1 | 83.3 |

Dielectric constant measurements cannot readily be made on the unpigmented plastic solutions themselves, i.e., without a large volume loading of a solid pigment or particulate substance such as barium titanate, because they are too soft for accurate thickness measurements. These unfilled plastics are too viscous to be tested in a conventional oil cell, and too soft to be tested as thin sheets with electrodes applied on each side. However, it has been demonstrated that the use of the 4:1 mixture in the phosphor layer as well as in the barium titanate layer results in an electroluminescent device considerably brighter than previous plastic or ceramic electroluminescent devices.

The cyanoethyl sucrose-cyanoethylated polysaccharide combination in a volume ratio of 1:1 to 5:1 is also characterized by a high A.-C. admittance, being highest in about the 4:1 ratio. This property is particularly useful in a material to be used as a matrix for light-transmitting electrically conductive glass paper, lacquer or other similar type of electrode.

Plastics made according to the invention and containing from 50% to 83% by volume of plasticizer are predominantly monomeric materials. However, they retain the plastic character of more highly polymeric materials.

Several cyanoethylated polysaccharides may be advantageously used as resins in conjunction with cyanoethyl sucrose. Included among polysaccharides which might be cyanoethylated to be used in the practice of this invention are virgin and regenerated cellulose, starch, hemicelluloses, xylan, polyglucuronic acid, chitin and glycogen.

Cyanoethyl starch and cyanoethyl cellulose both have the same general formula $(C_6H_7O_2) \cdot (OCH_2CH_2CN)_3$. Cyanoethyl sucrose has the general formula $$(C_{12}H_{14}O_3) \cdot (OCH_2CH_2CN)_8$$

The following examples illustrate methods for the preparation of phosphor, voltage barrier, and light-transmitting electrically conductive layers in a cyanoethyl sucrose-cyanoethylated polysaccharide matrix in accordance with the invention. In the example headings and the subsequent table, Roman numeral I is used to represent cyanoethyl cellulose, II for cyanoethyl starch, and III for cyanoethyl sucrose.

*Example 1.*—(1 part III:1 part I, phosphor layer)

3.0 grams of a green-emitting electroluminescent phosphor powder such as zinc-sulfide-zinc oxide activated with copper and chlorine are dispersed in a solution containing 6 grams of a solvent composed of equal parts acetone, methylethylketone (MEK) and dimethylformamide (DMF) and 0.616 gram of cyanoethyl sucrose. To this dispersion are added 0.616 gram of cyanoethylated cellulose, such as that made from regenerated cellulose and commercially known as Cyanocell, and the mixture thoroughly blended until uniform. This blended mixture is kept rolling until ready to coat. Coating may be effected by any of several standard techniques such as by a doctor blade. A layer .0075-inch wet thickness will dry to about .001-inch thick. This coating is suitable for use in series with an insulating layer, for instance .00025-inch thick polyethylene terephthalate film (marketed as Mylar by Du Pont) or an anodized aluminum sheet, or on one of the $BaTiO_3$ or $TiO_2$ layers described in subsequent examples. If used between anodized aluminum foil and a translucent electrode such as evaporated metal or semiconductor on a plastic film, or conducting glass cloth or paper, the layer should be cast about .022-inch wet thickness to prevent short circuiting of the cell on excitation with 110–120 volts A.C.

*Example 2.*—(4 parts III:1 part II, phosphor layer)

3.0 grams of an electroluminescent phosphor are dispersed in a solution containing 7.5 grams of a solvent composed of equal parts of DMF and acetone and 0.968 gram of cyanoethyl sucrose. To this dispersion are added 0.26 gram of cyanoethylated starch, which has been cyanoethylated to sufficient extent to be soluble in such polar solvents as nitromethane, acetone, dimethylformamide or dimethylsulfoxide. The mixture is blended until uniform and then kept rolling until ready to coat.

The mix is coated over an insulating substrate of $BaTiO_3$ in a suitable matrix as later described herein using a wet thickness of .0036-inch and drying to about .001-inch. If no insulating layer is used, thicknesses should be approximately doubled.

*Example 3.*—(5 parts III:1 part I, phosphor layer)

3.28 grams of a green-emitting electroluminescent phosphor such as zinc sulfide-zinc oxide activated with copper and chlorine are dispersed in a solution composed of 4.79 grams of a solvent prepared from equal parts of nitromethane, MEK and 1.20 grams of cyanoethyl sucrose. To this dispersion are added 0.24 gram of cyanoethylated cellulose, such as the Cyanocell previously mentioned, and the mixture is thoroughly blended until uniform. This produces a lacquer practical for coating by any of several standard techniques such as reverse roll coating or doctor blade coating to produce a wet layer .0075-inch thick which will dry to about .0012 thick.

*Example 4.*—(1 part III:1 part I, barrier layer)

200 grams of purest commercial grade barium titanate suspended in a solution containing 100 grams of a solvent composed of equal parts of acetone, MEK and DMF and 19.96 grams of cyanoethyl sucrose are ball milled 12 hours in a one quart mill with high density balls. The suspension is rinsed into 21.46 grams of cyanoethyl cellulose with 50 grams of the same solvents as mentioned above and blended with a high speed blender. This mix is coated by a suitable technique about .0078-inch wet to produce a coating about .0009-inch dry on aluminum foil or other such suitable conducting substrate. This insulator coating is suitable as a substrate for the previously mentioned phosphor coatings.

*Example 5.*—(3 parts III:1 part I, barrier layer)

200 grams of purest commercial grade barium titanate suspended in a solution containing 100 grams of a solvent composed of equal volumes of DMF, MEK and acetone plus 30.43 grams of cyanoethyl sucrose are ball milled 6 hours in a one quart mill with high density balls. The suspension is rinsed into 10.73 grams of cyanoethyl cellulose with 50 grams of the above-mentioned solvents and blended with a high speed mixer. This is coated on a metal foil electrode by any suitable technique such as those indicated in Example 3.

*Example 6.*—(4 parts III:1 part I, barrier layer)

A suspension as described in Example 4 is prepared with the amount of cyanoethyl sucrose increased to 32.5 grams and the amount of cyanoethyl cellulose reduced to 8.59 grams. The total amount of solvent used is 125 grams. This produces a coatable lacquer yielding insulating coatings suitable as electrical barriers for an electroluminescent lamp.

*Example 7.*—(*5 parts III:1 part I, barrier layer*)

A suspension as described in Example 4 is prepared with the amount of cyanoethyl sucrose increased to 33.9 grams and the amount of cyanoethyl cellulose reduced to 7.12 grams. This produces a coatable lacquer for an electrical barrier suitable as a substrate for the previously mentioned phosphor suspensions.

*Example 8.*—(*4 parts III:1 part II, barrier layer*)

A suspension as described in Example 4 is prepared using 32.5 grams of cyanoethyl sucrose. 8.52 grams of cyanoethyl starch are substituted for the cyanoethyl cellulose.

*Example 9.*—(*Electrically conductive lacquer*)

30.0 grams of the crushed conducting glass paper disclosed in the Jaffe patent 2,774,004 are milled for 2 hours in a half-pint mill at 290 r.p.m. with 25 grams of MEK. 1.8 grams of cyanoethyl cellulose and 15.0 grams cyanoethyl sucrose predissolved in nitromethane are then added to the mill and mixed for 3.5 hours at 30–40 r.p.m. This will produce a slurry of 36.5% by volume conducting glass paper, 57.0% cyanoethyl sucrose and 6.5% cyanoetheyl cellulose, providing an 8.77:1 ratio of plasticizer to resin. The slurry is coated on the phosphor layer of an electroluminescent lamp by any suittable technique to a wet thickness of 3–4 mils which will dry to 15–18 microns thick.

The ratio of 8.77:1 plasticizer to resin allows testing of the electrical properties. Generally, though, the ratio to be used in lamps would be from 1:1 to 5:1 for purposes of quantity production. This can be achieved by a modification of Example 9.

All three layers; namely, the phosphor, voltage barrier and light-transmitting electrode layers, are of similar structure. Each consists of a pigment or solid particulate substance dispersed in a plastic matrix, the composition of which is the subject of this invention. In the phosphor layer the pigment is the phosphor itself. In the voltage barrier layer the pigment is particulate $BaTiO_3$, $TiO_2$ or other high dielectric constant substance. In the light-transmitting electrode, the pigment is a conducting or semiconducting substance such as $InO_2$ either dispersed as such in the plastic or adherent to the surfaces of glass or other fibers which are dispersed in the plastic.

Two methods have been used to evaluate the effects and the usefulness of the plastic composition of this invention. The first is through the investigation of dielectric properties of barrier layers made according to the invention. This data has been presented above and is illustrated by FIG. 2. This graph shows the sharp peak in dielectric constant that occurs when the optimum ratio of cyanoethyl sucrose:cyanoethyl starch or: cyanoethyl cellulose is used. The other method of analysis, presented in the table below, is an ultimate test of the usefulness of this invention in an electroluminescent lamp. This data shows the actual brightnesses of lamps made according to the invention with varying ratios of plasticizer to resin in the respective phosphor and barrier layers as shown in the first column. The other three columns indicate by their headings the various combinations of plasticizer and resin used in the lamps tested with the ratio or combination in the phosphor layer given before the diagonal and the ratio or combination in the barrier layer given after the diagonal.

*Lamp brightness (ft. Lamberts)*

| Ratio of III:I or :II Phosphor/Barrier Layer | III:I/III:I | III:II/III:II | III:II/III:I |
|---|---|---|---|
| 1:1/1:1 | 5.4 | 6.06 | |
| 5:1/1:1 | 5.6 | | |
| 1:1/4:1 | 6.38 | | |
| 4:1/4:1 | 6.5 | 9.0 | 9.5 |
| 5:1/5:1 | 5.6 | 9.41 | |

The barrier and phosphor layers in these lamps were made according to the examples given above. The numbers represent averages of several lamps for each data point.

It can be seen from the table that the brightness of lamps using CNEC increases to a maximum at a ratio of 4:1 cyanoethyl sucrose:cyanoethyl cellulose and then begins to fall off again. This is in agreement with the behavior of the dielectric constant as shown in FIG. 2. When cyanoethyl starch is used, the brightness of a 5:1 lamp is even higher than that of a 4:1 lamp; however, the cyanoethyl starch becomes more difficult to work with as the ratio is increased. At the 5:1 ratio the cyanoethyl starch solution is quite tacky which makes volume production difficult even though brightness is slightly increased. As shown in the table, the greatest brightness is achieved with a 4:1 ratio of cyanoethyl sucrose:cyanoethyl starch in the phosphor layer and a 4:1 ratio of cyanoethyl sucrose:cyanoethyl cellulose in the barrier layer. Evidence is shown by the second data point in the cyanoethyl cellulose column that the use of a greater than 1:1 ratio, namely 5:1, in the phosphor layer alone is sufficient to improve the brightness of the resulting lamps. Likewise, the third point in the same column shows that the use of a greater than 1:1 ratio; namely, 4:1, in the barrier layer alone produces a considerable increase in brightness. The fourth data point in the cyanoethyl cellulose column goes further to prove that when a greater than 1:1 ratio is present in both the phosphor and barrier layers the effects are cumulative and the best results are thereby achieved.

For purposes of comparison, it can be stated that the prior commercial plastic electroluminescent lamps have given about 5.5 foot-Lamberts and a representative figure for commercial ceramic electroluminescent lamps is about 0.5 foot-Lamberts.

It will be evident from the above that the new compositions of matter comprising this invention possess unexpected and superior dielectric properties. Brightness results have proven the usefulness of this invention in electroluminescent devices.

What I claim as new and desire to secure by Letters Patent of the United States is:

1. A plastic composition of high dielectric constant consisting essentially of a solution of cyanoethylated polysaccharide in cyanoethyl sucrose in a volume ratio of cyanoethyl sucrose to cyanoethylated polysaccharide greater than 1:1 and not more than 5:1.

2. A plastic composition as set forth in claim 1 wherein the cyanoethylated polysaccharide is cyanoethyl starch.

3. A plastic composition as set forth in claim 1 wherein the cyanoethylated polysaccharide is cyanoethyl starch and the volume ratio of cyanoethyl sucrose to cyanoethyl starch is approximately 4:1.

4. A plastic composition as set forth in claim 1 wherein the cyanoethyl polysaccharide is cyanoethyl cellulose.

5. A plastic composition as set forth in claim 1 wherein the cyanoethyl polysaccharide is cyanoethyl cellulose and the volume ratio of cyanoethyl sucrose to cyanoethyl cellulose is approximately 4:1.

6. An electroluminescent device comprising a phosphor layer comprising solid particulate phosphor dispersed in a matrix; and a voltage barrier layer comprising solid particulate barrier material dispersed in a matrix disposed between electrode members at least one of which comprises a light-transmitting electrically conductive layer comprising light-transmitting electrically conductive particulate material dispersed in a matrix, the solid particulate substance of at least one of said layers being dispersed in a matrix consisting essentially of a solution of a cyanoethylated polyasccharide in cyanoethyl sucrose in a volume ratio not less than 1:1 and up to 1:5.

7. An electroluminescent device as set forth in claim 6 wherein the solid particulate substance of at least said phosphor layer is dispersed in a matrix of the said solution.

8. An electroluminescent device as set forth in claim 6 wherein the solid particulate substance of at least said voltage barrier layer is dispersed in a matrix of the said solution.

9. An electroluminescent device as set forth in claim 6 wherein the solid particulate substance of at least said light-transmitting electrically conductive layer is dispersed in a matrix of the said solution.

10. An electroluminescent device as set forth in claim 6 wherein the solid particulate substance of at least said phosphor layer and said voltage barrier layer are dispersed in matrices of the said solution.

11. An electroluminescent device as set forth in claim 6 wherein the solid particulate substance of all three said layers are dispersed in matrices of said solution.

12. An electroluminescent device as set forth in claim 6 wherein said cyanoethylated polysaccharide is cyanoethyl starch.

13. An electroluminescent device as set forth in claim 6 wherein said cyanoethylated polysaccharide is cyanoethyl starch and the volume ratio thereof to cyanoethyl sucrose is about 1:4.

14. An electroluminescent device as set forth in claim 6 wherein said cyanoethylated polysaccharide is cyanoethyl cellulose.

15. An electroluminescent device as set forth in claim 6 wherein said cyanoethylated polysaccharide is cyanoethyl cellulose and the volume ratio thereof to cyanoethyl sucrose is about 1:4.

References Cited by the Examiner
UNITED STATES PATENTS

| | | | |
|---|---|---|---|
| 2,836,511 | 5/1958 | Sample | 117—165 |
| 2,918,594 | 12/1959 | Fridrich | 313—108 |
| 3,059,118 | 10/1962 | Koury | 313—108 X |
| 3,068,220 | 12/1962 | Touery et al. | 260—209 |
| 3,161,539 | 12/1964 | Touery et al. | 252—63.7 X |
| 3,161,797 | 12/1964 | Butler et al. | 313—108.1 |

GEORGE N. WESTBY, *Primary Examiner.*